United States Patent
Huang

(10) Patent No.: US 8,272,535 B2
(45) Date of Patent: Sep. 25, 2012

(54) FEEDING SYSTEM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 492 days.

(21) Appl. No.: 12/620,735

(22) Filed: Nov. 18, 2009

(65) Prior Publication Data

US 2010/0163575 A1    Jul. 1, 2010

(30) Foreign Application Priority Data

Dec. 31, 2008    (CN) .......................... 2008 1 0306722

(51) Int. Cl.
*B67D 7/16* (2010.01)

(52) U.S. Cl. .......................................... 222/52; 222/148

(58) Field of Classification Search .................. 222/148, 222/52, 63, 333, 342, 39; 425/580
See application file for complete search history.

(56) References Cited

U.S. PATENT DOCUMENTS

| | | | | |
|---|---|---|---|---|
| 2,501,595 | A * | 3/1950 | Bohannon | 425/448 |
| 3,995,770 | A * | 12/1976 | Schwitters | 222/56 |
| 5,060,336 | A * | 10/1991 | LaLonde | 15/104.095 |
| 6,467,121 | B1 * | 10/2002 | Franzino et al. | 15/104.09 |
| 7,540,397 | B2 * | 6/2009 | Muderlak et al. | 222/400.5 |
| 7,640,876 | B2 * | 1/2010 | Memory | 111/170 |
| 7,654,097 | B2 * | 2/2010 | Hawkes | 62/137 |
| 8,109,301 | B1 * | 2/2012 | Denise | 141/360 |
| 2007/0132131 | A1 * | 6/2007 | Tokura et al. | 264/45.5 |
| 2007/0277392 | A1 * | 12/2007 | Zlotos et al. | 34/443 |
| 2008/0128458 | A1 * | 6/2008 | Njaastad et al. | 222/639 |
| 2009/0314798 | A1 * | 12/2009 | Hovinen et al. | 222/23 |
| 2010/0161140 | A1 * | 6/2010 | Doglioni Majer | 700/283 |

* cited by examiner

*Primary Examiner* — Kevin P Shaver
*Assistant Examiner* — Donnell Long
(74) *Attorney, Agent, or Firm* — Altis Law Group, Inc.

(57) ABSTRACT

A feeding system includes a hopper for containing materials therein, a dispensing pipe, a sensor, a scraper, a driving mechanism. The dispensing pipe is connected to the hopper and is configured for dispensing the materials in the hopper to a predetermined position. The sensor is arranged adjacent to the dispensing pipe and is configured for detecting an amount of the materials loaded in the dispensing pipe. The scraper is arranged in the dispensing pipe and is configured for removing the materials remained on the inner wall of the dispensing pipe by scraping the inner wall of the dispensing pipe. The driving mechanism is configured for driving the scraper to rotate in the dispensing pipe and scrape along the inner wall of the dispensing pipe.

20 Claims, 3 Drawing Sheets

FEEDING SYSTEM

BACKGROUND

1. Technical Field

The present disclosure relates to feeding systems, and particularly, to a feeding system used in an injection molding machine.

2. Description of Related Art

Injection molding machines are widely used for injection molding plastic workpieces. Feeding systems are key systems of such injection molding machines.

A typical feeding system includes a hopper for containing materials, a dispensing pipe connected to the hopper and configured for dispensing the materials to a predetermined position, and a sensor configured for detecting amount of the materials loaded in the dispensing pipe. When the amount of the materials loaded in the dispensing pipe is not enough to be dispensed, the sensor would output an alarm to reload the hopper.

However, the materials for making the plastic workpieces are easy to be adhered to inner wall of the dispensing pipe due to static electricity, and when the materials adhered to the inner wall accumulate to a certain level, the sensor cannot output the alarm for reloading the hopper.

What is needed, therefore, is a feeding system which can overcome the above shortcomings.

BRIEF DESCRIPTION OF THE DRAWINGS

Many aspects of the present feeding system can be better understood with reference to the following drawings. The components in the drawings are not necessarily drawn to scale, the emphasis instead being placed upon clearly illustrating the principles of the present feeding system. Moreover, in the drawings, like reference numerals designate corresponding parts throughout the several views.

DETAILED DESCRIPTION OF EMBODIMENTS

Embodiments of the present feeding system will now be described in detail below and with reference to the drawings.

Figure 1:
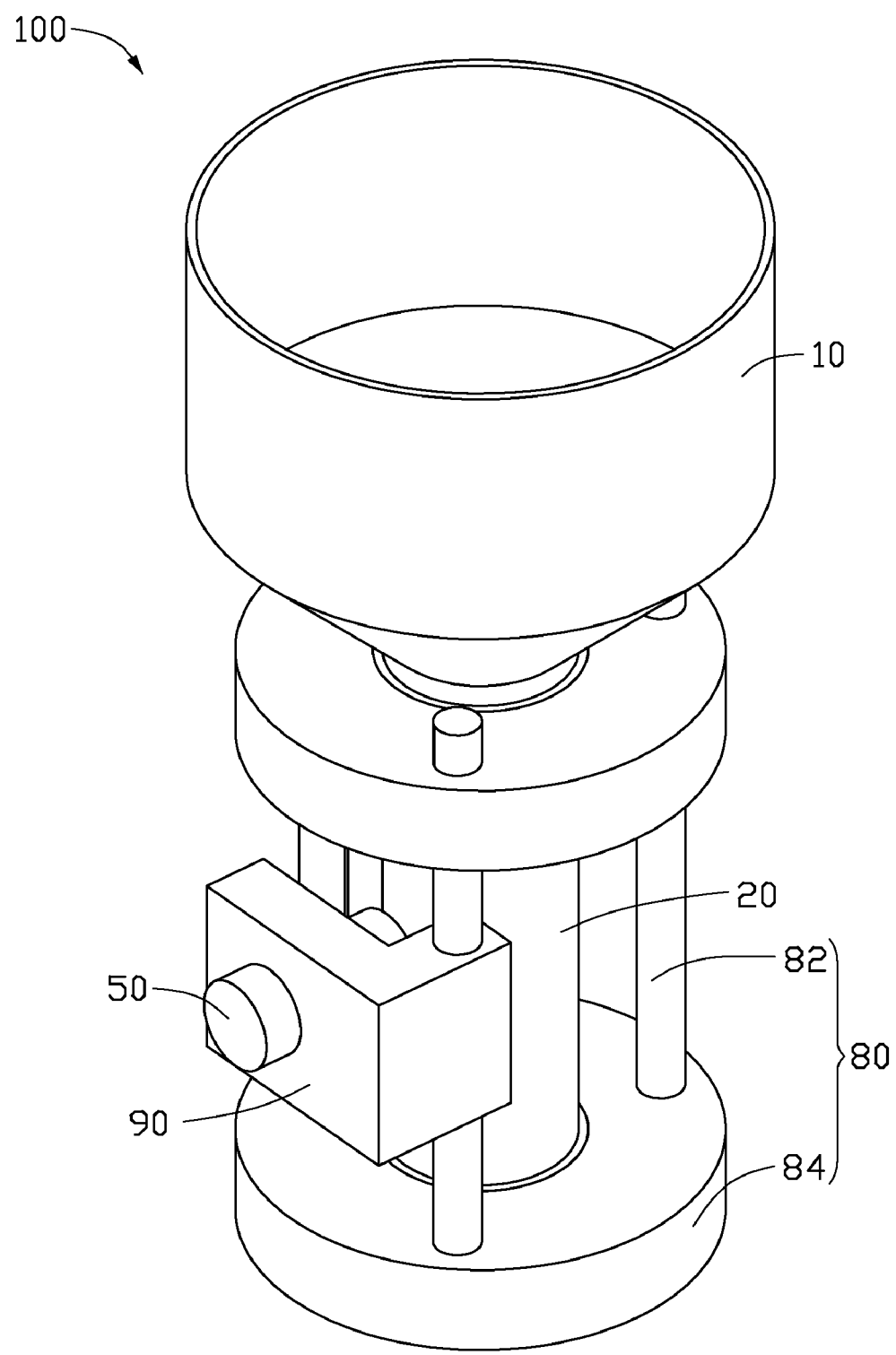
FIG. 1 is an isometric schematic view of a feeding system in accordance with an embodiment.
Figure 2:
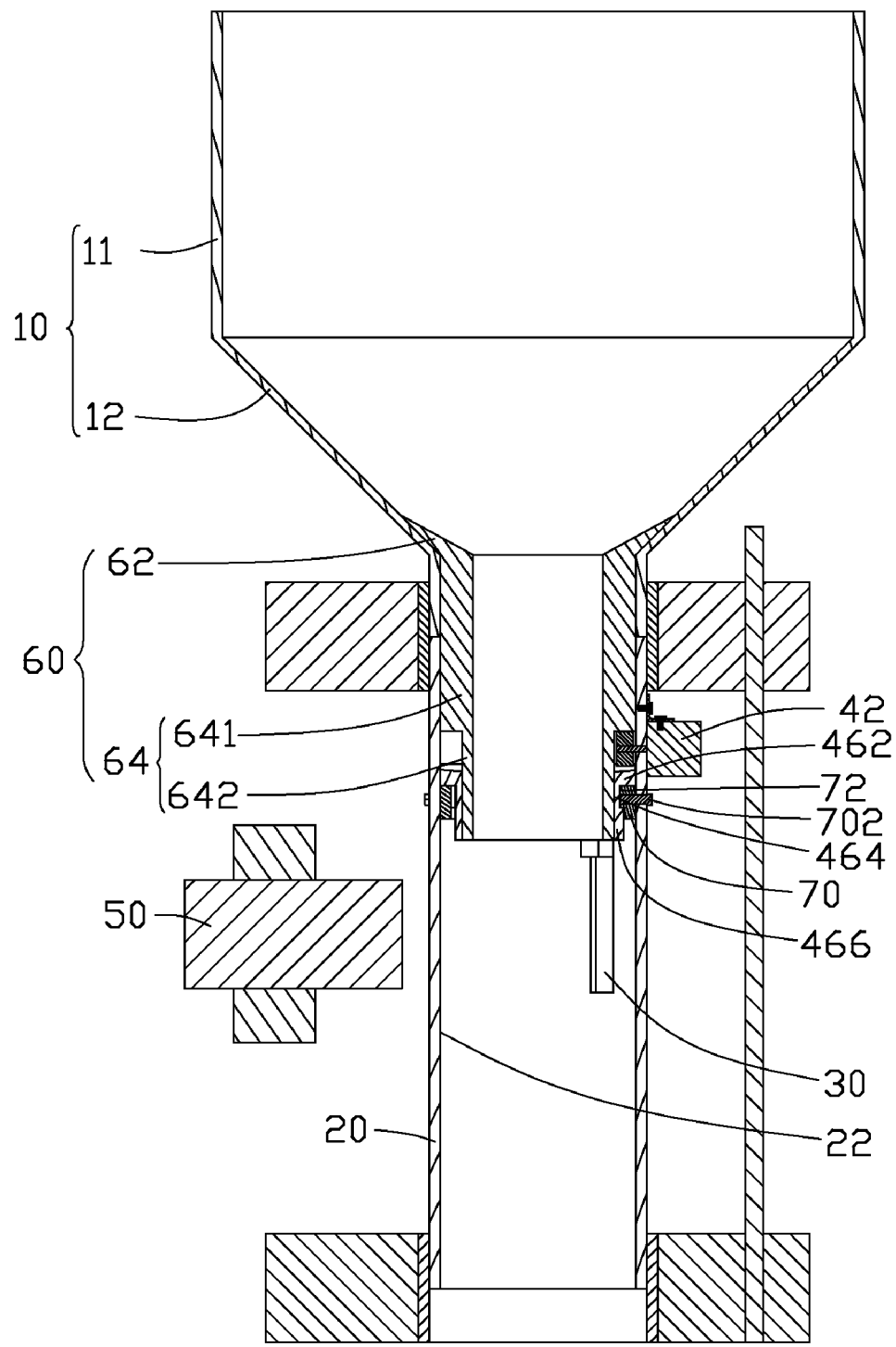
FIG. 2 is a cross-sectional view of the feeding system of FIG. 1.
Figure 3:
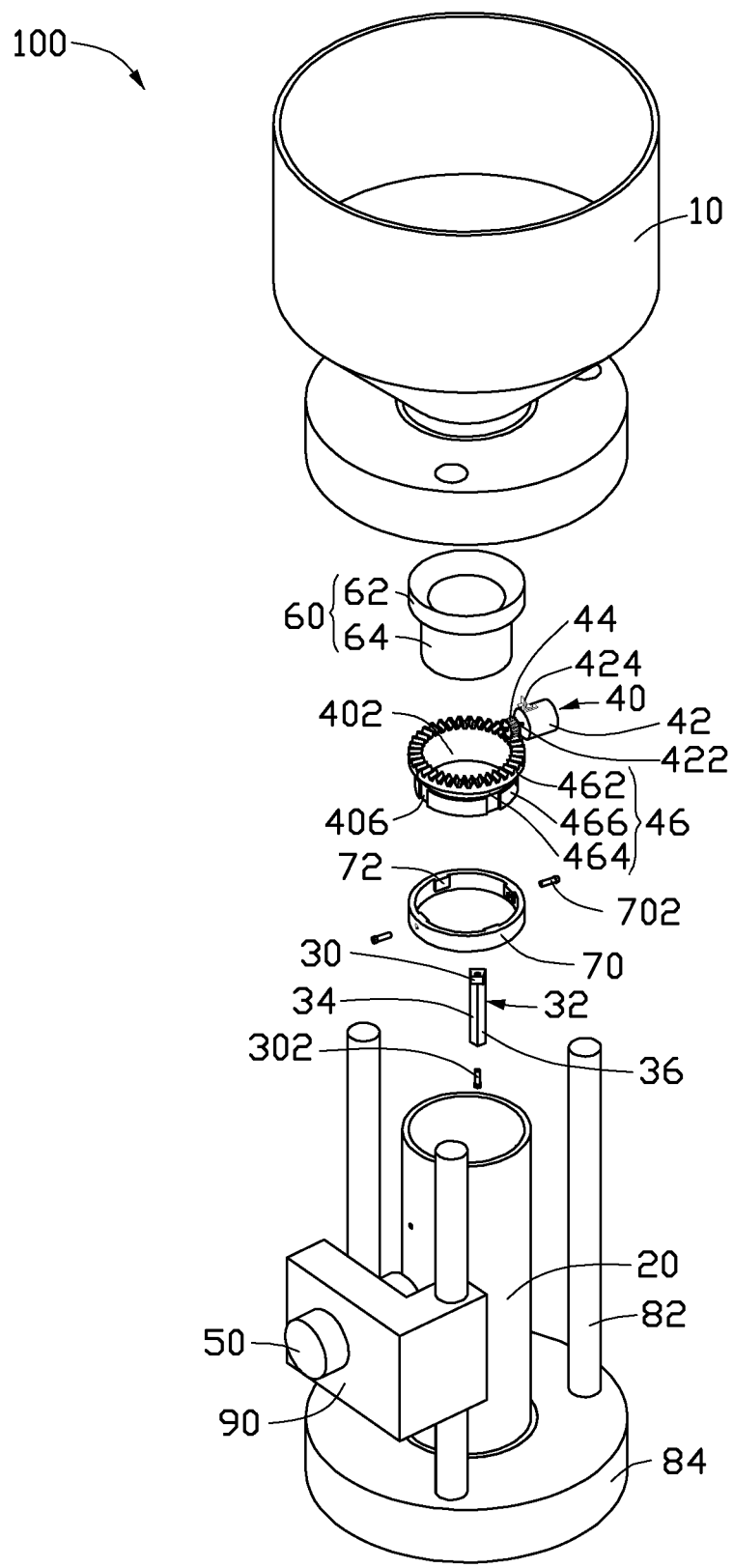
FIG. 3 is an exploded view of the feeding system of FIG. 1.

Referring to FIGS. 1 to 3, a feeding system 100 mainly includes a hopper 10, a dispensing pipe 20 connected to the hopper 10, a sensor 50, a scraper 30 and a driving mechanism 40.

The hopper 10 is for containing materials in readiness for dispensation. In the present embodiment, the hopper 10 includes a hollow cylindrical upper portion 11 and a hollow truncated cone-shaped lower portion 12. The lower portion 12 has a larger end connected to the upper portion 11 and a smaller end connected to the dispensing pipe 20. In other embodiments, the hopper 10 can be truncated cone-shaped.

The dispensing pipe 20 is elongated cylindrical shaped. The dispensing pipe 20 is transparent. The sensor 50 is an infrared photoelectric sensor, and is arranged outside the dispensing pipe 20. The sensor 50 is configured for detecting amount of the materials loaded in the dispensing pipe 20. When the amount of the materials loaded in the dispensing pipe 20 is not enough to be dispensed, the sensor 50 gives an alarm for reloading the hopper 10.

The driving mechanism 40 includes a motor 42, a driving gear 44 connected to the motor 42, and a hollow driven gear 46 driven by the driving gear 44. The motor 42 is mounted to the outer wall of the dispensing pipe 20 by a fixing member 424. The motor 42 has a rotatable shaft 422 extending into the dispensing pipe 20. The driving gear 44 is connected to the rotatable shaft 422, and is arranged in the dispensing pipe 20. The driven gear 46 includes a hollow gear portion 462, a hollow engaging portion 464 connected to the gear portion 462, and a hollow fitting portion 466 connected to the engaging portion 464. The gear portion 462 is driven by the driving gear 44. The fitting portion 466 has four recesses 406 formed at outer wall thereof. The gear portion 462 is protrudent relative to the engaging portion 464 and the fitting portion 466. The engaging portion 464 is flat relative to the recesses 406.

The scraper 30 is elongated, and has an arc-shaped side surface 32, a flat first side surface 34 and a flat second side surface 36. The scraper 30 is connected to the fitting portion 466 by a screw 302, and the arc-shaped surface 32 contacts an inner wall of the dispensing pipe 20. When the driven gear 46 is driven to rotate, the arc-shaped surface 32 of the scraper 30 is moved along the inner wall of the dispensing pipe 20, and thus scraping any materials adhered to the inner wall of the dispensing pipe 20. Due to the scraper 30, materials remained at the inner wall of the dispensing pipe 20 by static electricity can be reduced, and then the sensor 50 can work normally.

In the present embodiment, an intermediate ring 60, a retaining ring 70 and a strengthening member 80 are further provided. The retaining ring 70 is fixed to the inner wall of the dispensing pipe 20 using screws 702. The retaining ring 70 has four protrusions 72 formed at inner wall thereof. The protrusions 72 can slip through the recesses 406 and movably engage with the engaging portion 464. With this configuration, the driven gear 46 is supported by the retaining ring 70, and is rotatable relative to the retaining ring 70.

The intermediate ring 60 includes a hollow truncated cone-shaped portion 62 and a hollow cylindrical portion 64. The intermediate ring 60 is arranged between the hopper 10 and the dispensing pipe 20, with the truncated cone-shaped portion 62 located in the hopper 10, and the cylindrical portion 64 located in the dispensing pipe 20. Thickness of the side wall of truncated cone-shaped portion 62 gradually decreases from an end adjacent to the dispensing pipe 20 to an end distal from the dispensing pipe 20. The cylindrical portion 64 includes a first part 641 connected to the truncated cone-shaped portion 62, and a second part 642 connected to the first part 641. The side wall of the second part 642 is thinner than that of the first part 641. The second part 642 extends through a through hole 402 of the of the driven gear 46, and is fixedly engaged in the inner wall of the driven gear 46, such that the entire intermediate ring 60 can be rotated together with the driven gear 46.

The strengthening member 80 includes two seats 84 and three posts 82 connecting the seats 84. The two seats 84 each have through holes defined therein, and the dispensing pipe 20 is engaged with the inner wall of the through holes, such that the dispensing pipe 20 together with the hopper 10 can be supported by the two seats 84. The sensor 50 is mounted at one of the posts 82 by an "L" shaped fixing member 90.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A feeding system, comprising:
a hopper for containing materials therein;
a dispensing pipe connected to the hopper and configured for dispensing the materials in the hopper;
a sensor arranged adjacent to the dispensing pipe and configured for detecting an amount of the materials loaded in the dispensing pipe;
an intermediate ring arranged between the hopper and the dispensing pipe;
a scraper arranged in the dispensing pipe and configured for removing the materials remaining on the inner wall of the dispensing pipe by scraping the inner wall of the dispensing pipe; and
a driving mechanism connected to both the intermediate ring and the scraper, and configured for driving the intermediate ring to rotate between the hopper and the dispensing pipe and thereby driving the scraper to rotate in the dispensing pipe along the inner wall of the dispensing pipe.

2. The feeding system as described in claim 1, wherein the scraper is elongated.

3. The feeding system as described in claim 1, wherein the scraper has an arc-shaped side surface for contacting the inner wall of the dispensing pipe, and a first and a second flat side surfaces both connecting the arc-shaped side surface.

4. The feeding system as described in claim 1, wherein the dispensing pipe is transparent; and the sensor includes a photoelectric sensor and is arranged outside of the dispensing pipe.

5. The feeding system as described in claim 4, wherein the photoelectric sensor includes an infrared sensor.

6. The feeding system as described in claim 4, further comprising a strengthening member, the strengthening member comprising two spaced seats and three posts connecting the seats, the seats each having a through hole defined therein, the dispensing pipe engaged in the through holes, and the sensor being mounted at one of the posts.

7. The feeding system as described in claim 1, wherein the driving mechanism comprises a motor, a driving gear connected to the motor, and a driven gear driven by the driving gear, and the intermediate ring and the scraper are connected to the driven gear.

8. The feeding system as described in claim 6, further comprising a retaining ring mounted to the inner wall of the dispensing pipe, the driven gear being disposed on the retaining ring and rotatable relative to the retaining ring.

9. A feeding system, comprising:
a hopper for containing a material therein;
a dispensing pipe connected to the hopper and configured for dispensing the material in the hopper;
a sensor arranged adjacent to the dispensing pipe and configured for detecting an amount of the material loaded in the dispensing pipe;
an intermediate ring arranged between the hopper and the dispensing pipe;
an elongated scraper arranged in the dispensing pipe, the scraper having an arc-shaped surface for contacting the inner wall of the dispensing pipe, and a first and a second flat side surfaces both connecting the arc-shaped surface, the scraper being configured for removing the material remaining on the inner wall of the dispensing pipe; and
a driving mechanism connected to both the intermediate ring and the scraper, and configured for driving the intermediate ring to rotate between the hopper and the dispensing pipe and thereby driving the scraper to rotate in the dispensing pipe and scrape along the inner wall of the dispensing pipe.

10. The feeding system as described in claim 9, wherein the dispensing pipe is transparent; and the sensor includes an infrared photoelectric sensor and is arranged outside the dispensing pipe.

11. The feeding system as described in claim 9, further comprising a strengthening member, the strengthening member comprising two spaced seats and three posts connecting the seats, the seats each having a through hole defined therein, the dispensing pipe engaged in the through holes, and the sensor being mounted at one of the posts.

12. The feeding system as described in claim 9, wherein the driving mechanism comprises a motor, a driving gear connected to the motor, and a driven gear driven by the driving gear, and the intermediate ring and the scraper are connected to the driven gear.

13. The feeding system as described in claim 12, further comprising a retaining ring mounted to the inner wall of the dispensing pipe, the driven gear being disposed on the retaining ring and rotatable relative to the retaining ring.

14. The feeding system as described in claim 1, wherein the hopper comprises a hollow cylindrical upper portion and a hollow truncated cone-shaped lower portion, and the lower portion comprises a larger end connected to the upper portion and a smaller end connected to the dispensing pipe.

15. The feeding system as described in claim 14, wherein the intermediate ring comprises a hollow truncated cone-shaped portion located in the lower portion of the hopper, and a hollow cylindrical portion located in the dispensing pipe, a thickness of the side wall of the truncated cone-shaped portion gradually decreases from an end adjacent to the dispensing pipe to an end distant from the dispensing pipe, and the driving mechanism is connected to the cylindrical portion.

16. The feeding system as described in claim 15, wherein the driving mechanism comprises a motor, a driving gear connected to the motor, and a driven gear engaged with and driven by the driving gear, the driven gear comprises a through hole, the cylindrical portion of the intermediate ring is engaged in the through hole of the driven gear, and the scraper is connected to an outer wall of the driven gear.

17. The feeding system as described in claim 9, wherein the hopper comprises a hollow cylindrical upper portion and a hollow truncated cone-shaped lower portion, and the lower portion comprises a larger end connected to the upper portion and a smaller end connected to the dispensing pipe.

18. The feeding system as described in claim 17, wherein the intermediate ring comprises a hollow truncated cone-shaped portion located in the lower portion of the hopper, and a hollow cylindrical portion located in the dispensing pipe, a thickness of the side wall of the truncated cone-shaped portion gradually decreases from an end adjacent to the dispensing pipe to an end distant from the dispensing pipe, and the driving mechanism is connected to the cylindrical portion.

19. The feeding system as described in claim 18, wherein the driving mechanism comprises a motor, a driving gear connected to the motor, and a driven gear engaged with and driven by the driving gear, the driven gear comprises a through hole, the cylindrical portion of the intermediate ring is engaged in the through hole of the driven gear, and the scraper is connected to an outer wall of the driven gear.

20. A feeding system, comprising:
a hopper for containing a material therein;
a dispensing pipe connected to the hopper and configured for dispensing the material in the hopper;

a sensor arranged adjacent to the dispensing pipe and configured for detecting an amount of the material loaded in the dispensing pipe;

an elongated scraper arranged in the dispensing pipe, the scraper having an arc-shaped surface for contacting the inner wall of the dispensing pipe, and a first and a second flat side surfaces both connecting the arc-shaped surface, the scraper being configured for removing the material remaining on the inner wall of the dispensing pipe;

a strengthening member comprising two spaced seats and three posts connecting the seats, the seats each having a through hole defined therein, the dispensing pipe engaged in the through holes, and the sensor being mounted at one of the posts; and a driving mechanism configured for driving the scraper to rotate in the dispensing pipe and scrape along the inner wall of the dispensing pipe.

* * * * *